United States Patent
Hennecke et al.

(10) Patent No.: US 11,604,259 B2
(45) Date of Patent: Mar. 14, 2023

(54) SCANNING LIDAR RECEIVER WITH A SILICON PHOTOMULTIPLIER DETECTOR

(71) Applicant: Infineon Technologies AG, Neubiberg (DE)

(72) Inventors: Marcus Edward Hennecke, Graz (AT); Boris Kirillov, Graz (AT)

(73) Assignee: Infineon Technologies AG, Neubiberg (DE)

( * ) Notice: Subject to any disclaimer, the term of this patent is extended or adjusted under 35 U.S.C. 154(b) by 719 days.

(21) Appl. No.: 16/600,911

(22) Filed: Oct. 14, 2019

(65) Prior Publication Data

US 2021/0109199 A1    Apr. 15, 2021

(51) Int. Cl.

| | |
|---|---|
| *G01S 7/481* | (2006.01) |
| *G02B 26/08* | (2006.01) |
| *G02B 26/10* | (2006.01) |
| *G01S 7/486* | (2020.01) |
| *G01S 7/4865* | (2020.01) |
| *G01S 17/10* | (2020.01) |
| *G01S 7/48* | (2006.01) |

(52) U.S. Cl.
CPC .......... *G01S 7/4816* (2013.01); *G01S 7/4808* (2013.01); *G01S 7/4817* (2013.01); *G01S 7/4865* (2013.01); *G01S 7/4868* (2013.01); *G01S 17/10* (2013.01); *G02B 26/0833* (2013.01); *G02B 26/105* (2013.01)

(58) Field of Classification Search
CPC .... G01S 7/4816; G01S 7/4808; G01S 7/4817; G01S 7/4865; G01S 7/4868; G01S 7/487; G01S 17/10; G01S 17/42; G01S 17/89; G02B 26/101; G02B 26/105; G02B 26/0833; G02B 26/0825
See application file for complete search history.

(56) References Cited

U.S. PATENT DOCUMENTS

| | | | |
|---|---|---|---|
| 10,063,849 B2 * | 8/2018 | Pacala | G02B 3/0056 |
| 2017/0176575 A1 * | 6/2017 | Smits | G01S 7/4808 |
| 2018/0106900 A1 * | 4/2018 | Droz | G01J 1/0411 |
| 2018/0113200 A1 * | 4/2018 | Steinberg | G01S 17/42 |
| 2018/0167602 A1 * | 6/2018 | Pacala | G02B 5/208 |
| 2019/0353767 A1 * | 11/2019 | Eberspach | G01J 1/4228 |
| 2020/0116558 A1 * | 4/2020 | Pacala | G01S 7/4815 |
| 2020/0142034 A1 * | 5/2020 | Shepard | G01S 7/4863 |

* cited by examiner

*Primary Examiner* — John W Miller
*Assistant Examiner* — Sean N. Haiem
(74) *Attorney, Agent, or Firm* — Harrity & Harrity, LLP

(57) ABSTRACT

A Light Detection and Ranging (LIDAR) receiver includes a receiver optics configured to receive at least one laser beam and direct the at least one laser beam along a receiver path; at least one silicon photomultiplier (SiPM) pixel including an array of single-photon avalanche diode (SPAD) pixels, the at least one SiPM pixel configured to generate at least one electrical signal based on the at least one laser beam; and a spatial filter arranged between the receiver optics and the at least one SiPM pixel, the spatial filter including an aperture located at a focal point of the receiver optics that is configured to permit a passage of the at least one laser beam therethrough and spread the at least one laser beam across the array of SPAD pixels in at least one direction.

20 Claims, 8 Drawing Sheets

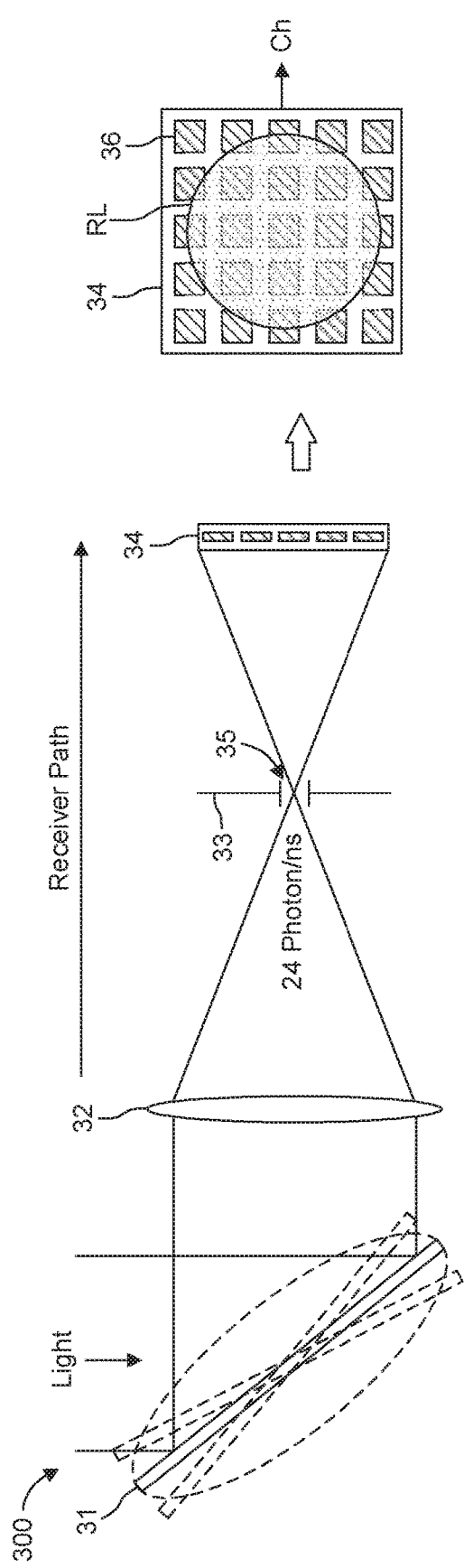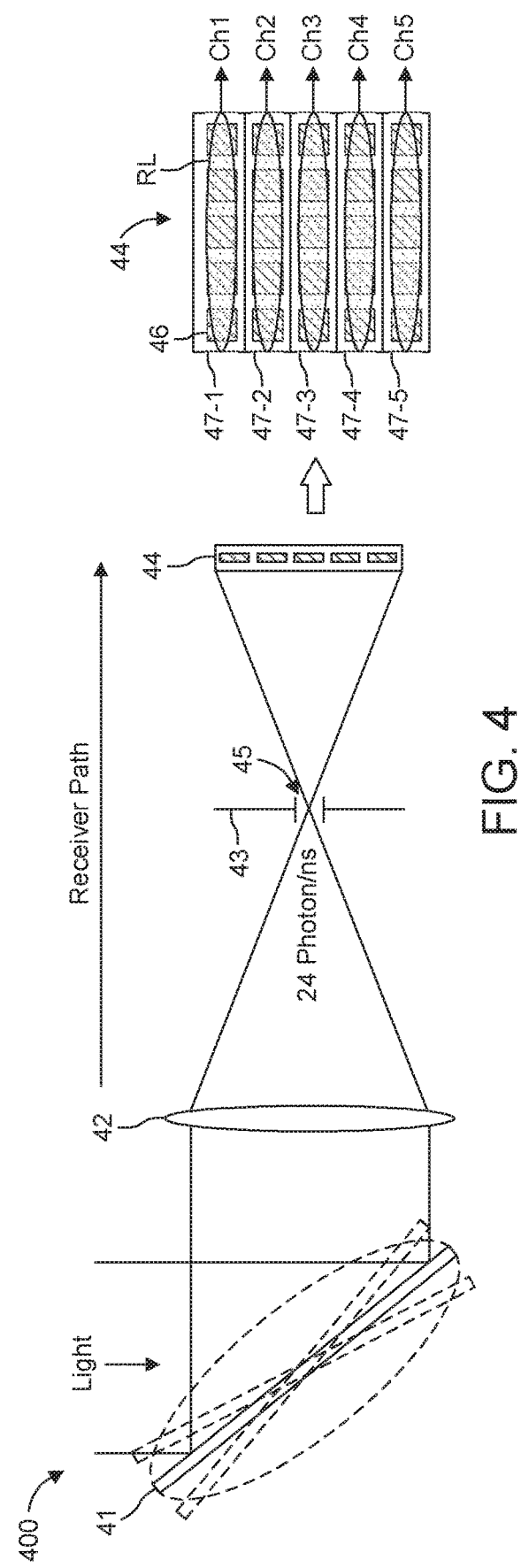
FIG. 3
FIG. 4

SCANNING LIDAR RECEIVER WITH A SILICON PHOTOMULTIPLIER DETECTOR

FIELD

The present disclosure relates generally to a Light Detection and Ranging (LIDAR) receiver that uses one or more silicon photomultiplier (SiPM) cells.

BACKGROUND

Light Detection and Ranging (LIDAR), is a remote sensing method that uses light in the form of a pulsed laser to measure ranges (variable distances) to one or more objects in a field of view. In particular, light is transmitted towards the object. Single photodetectors or arrays of photodetectors receive reflections from objects illuminated by the light, and the time it takes for the reflections to arrive at various sensors in the photodetector array is determined. This is also referred to as measuring time-of-flight (ToF). LIDAR systems form depth measurements and make distance measurements by mapping the distance to objects based on the time-of-flight computations. Thus, the time-of-flight computations can create distance and depth maps, which may be used to generate images.

A silicon photomultiplier (SiPM) array is used for detecting light. Each SiPM cell of a SiPM array comprises an array of single-photon avalanche diodes (SPADs), and each SPAD is configured to detect one photon at a time. After detecting a photon, a SPAD becomes blind (i.e., unable to detect another photon) for a predetermined time period (e.g., 10 ns) until the internal capacitance of the SPAD recharges to a bias voltage. This predetermined time period may be referred to as a dead time, a recovery time, or a recharge time, all of which are interchangeable as used herein.

An issue arises in LIDAR in which it is difficult to detect signal photons, which are photos that are received in a reflected laser beam that correspond to a laser beam transmitted from a LIDAR transmitter. Instead, each SiPM cell, and thus each SPAD, would be constantly bombarded with ambient light photons in the process of trying to detect reflected laser light. An ambient photon from ambient light would trigger a detection and a recharge of a SPAD, resulting in the SPAD being blind to signal photons for the predetermined time period. Moreover, there are typically many more ambient photons from ambient light compared to signal photons from a laser beam. As a result, a SiPM cell would always be saturated and the probability to catch a signal photon would be near zero.

Thus, a LIDAR receiver using one or more SiPM cells capable of detecting signal photons corresponding to laser light may be desired.

SUMMARY

Embodiments provide a Light Detection and Ranging (LIDAR) receiver that includes a receiver optics having a focal plane and configured to receive at least one laser beam and direct the at least one laser beam along a receiver path; at least one silicon photomultiplier (SiPM) pixel including an array of single-photon avalanche diode (SPAD) pixels, the at least one SiPM pixel configured to generate at least one electrical signal based on the at least one laser beam; and a spatial filter arranged in the focal plane of the receiver optics located between the receiver optics and the at least one SiPM pixel, the spatial filter including an aperture located at a focal point of the receiver optics that is configured to permit a passage of the at least one laser beam therethrough and spread the at least one laser beam in at least one direction orthogonal to the receiver path such that the at least one laser beam is spread across the array of SPAD pixels in the at least one direction.

Embodiments provide a LIDAR receiver that includes a receiver optics having a focal plane and configured to receive at least one laser beam and direct the at least one laser beam along a receiver path; at least one SiPM pixel including an array of SPAD pixels, the at least one SiPM pixel configured to generate at least one electrical signal based on the at least one laser beam; a spatial light modulator arranged in the focal plane of the receiver optics located between the receiver optics and the at least one SiPM pixel, wherein the spatial light modulator includes an array of modulator elements that comprises a plurality of columns and a plurality of rows, each of the modulator elements is configured to switchably direct light towards or away from the at least one SiPM pixel; and a controller configured to sequentially activate sections of the spatial light modulator such that activated modulator elements of an activated section direct the at least one laser beam towards the at least one SiPM pixel.

BRIEF DESCRIPTION OF THE DRAWINGS

Embodiments are described herein making reference to the appended drawings.

FIG. 3 is a schematic diagram of a LIDAR receiver 300 according to one or more embodiments;

FIG. 4 is a schematic diagram of a LIDAR receiver 400 according to one or more embodiments;

DETAILED DESCRIPTION

Figure 1:
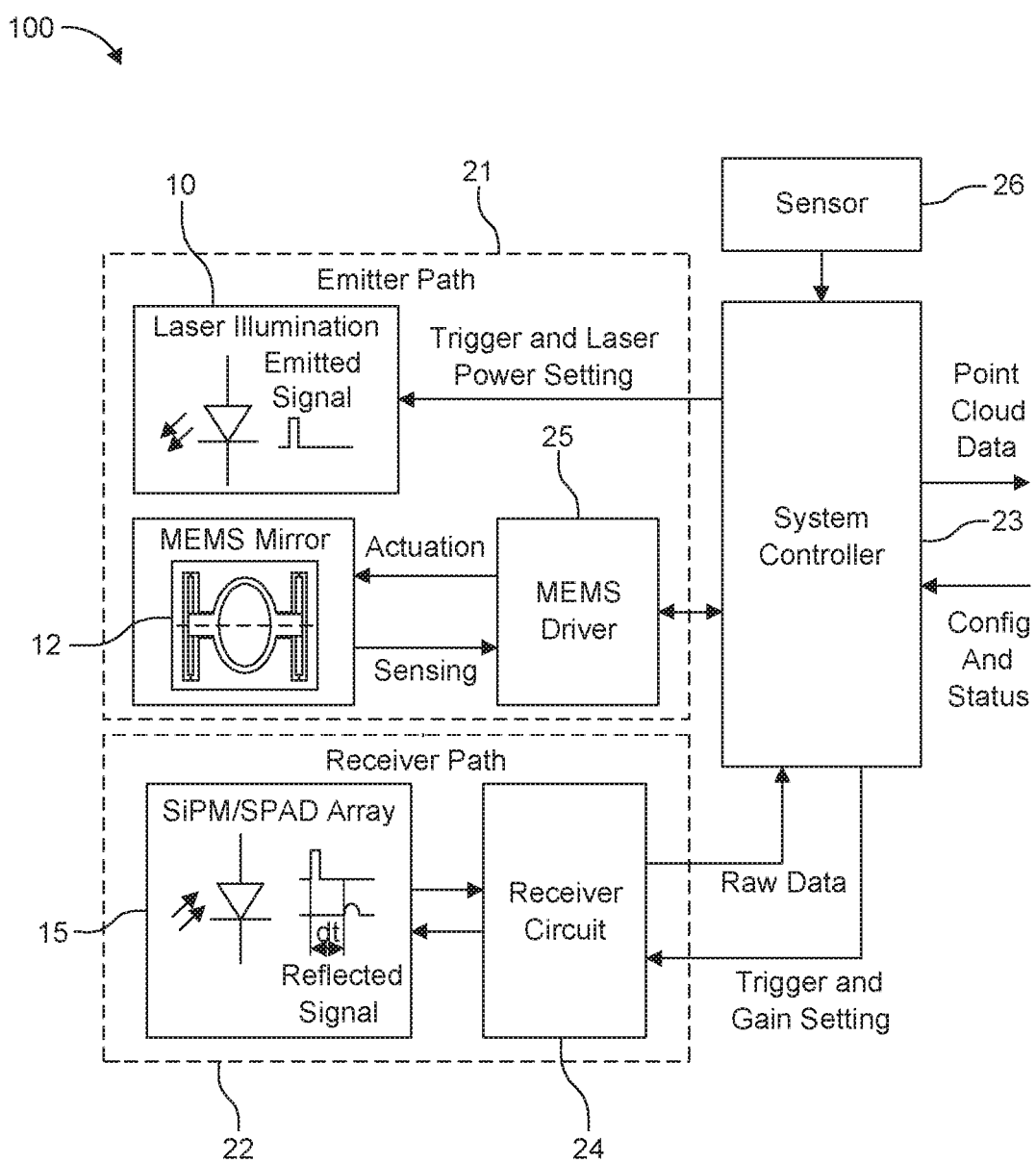
FIG. 1 is a schematic block diagram of the LIDAR scanning system 100 in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a photodetector array that includes multiple photodetector pixels detects and measures the reflected beams. For example, an array of photodetectors receives reflections from objects illuminated by the light.

Embodiments are directed to a LIDAR receiver using one or more a silicon photomultiplier (SiPM) cells capable of detecting signal (laser) photons corresponding to laser light while reducing the influence of ambient photons. This may be achieved by reducing the number of ambient photons capable of reaching a single-photon avalanche diode (SPAD) while allowing signal photons to reach a SPAD. This increases the chances of detecting a useful signal photon that corresponds to a transmitted laser beam. Alternatively, this may be achieved with digital optical filtering that is configured to estimate onto which pixels the laser light spectrum will be incident and activate and/or give more weight to those pixels as supposed to those pixels that may receive ambient light.

FIG. 1 is a schematic block diagram of the LIDAR scanning system 100 in accordance with one or more embodiments. In particular, FIG. 1 shows additional features of the LIDAR scanning system 100, including example processing and control system components such as a MEMS driver, a receiver circuit, and a system controller that includes signal processing circuitry.

The LIDAR scanning system 100 includes a transmitter unit 21 that is responsible for an emitter path of the system 100, and a receiver unit 22 that is responsible for a receiver path of the system 100. The system also includes a system controller 23 that is configured to control components of the transmitter unit 21 and the receiver unit 22, and to receive raw digital data from the receiver unit 22 and perform processing thereon (e.g., via digital signal processing) for generating object data (e.g., point cloud data). Thus, the system controller 23 includes at least one processor and/or processor circuitry (e.g., comparators and digital signal processors (DSPs)) of a signal processing chain for processing data, as well as control circuitry, such as a microcontroller, that is configured to generate control signals.

The LIDAR scanning system 100 may also include a sensor 26, such as a temperature sensor, that provides temperature sensor information to the system controller 23. For example, sensor 26 may measure a laser temperature of the illumination unit 10, and the system controller 23 may use the measured laser temperature to perform a calibration, determine which SPAD pixels to activate/deactivate, or determine which SPAD pixels correspond to received laser light and which SPAD pixels correspond to received ambient light.

The transmitter unit 21 includes an illumination unit 10, a MEMS mirror 12, and a MEMS driver 25 configured to drive the MEMS mirror 12.

The illumination unit 10 is a laser array that includes one or more light sources (e.g., laser diodes, light emitting diodes, or laser channels) that are configured to transmit light used for scanning a field of view for objects. The light emitted by the light sources is typically infrared light although light with another wavelength might also be used. The shape of the light emitted by the light sources may be spread in a direction perpendicular to a scanning direction to form a light beam with an oblong shape extending, lengthwise, perpendicular to the scanning direction. The illumination light transmitted from the light sources may be directed towards a transmitter optics (not illustrated) that is configured to focus each laser onto a MEMS mirror 12, which in turn directs the laser beams into the field of view. The transmitter optics may be, for example, a lens or a prism.

The MEMS mirror 12 is a mechanical moving mirror (i.e., a MEMS micro-mirror) integrated on a semiconductor chip (not shown). The MEMS mirror 12 according to this embodiment is configured to rotate about one or more scanning axes for scanning laser light in the field of view. For instance, the MEMS mirror 12 may be configured to oscillate "side-to-side" about a single scanning axis such that the light reflected from the MEMS mirror 12 oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by vertical bar of light by changing the angle of the MEMS mirror 12 on its scanning axis. For example, the MEMS mirror 12 may be configured to oscillate between +/−15 degrees in a horizontal scanning direction to steer the light over +/−30 degrees (i.e., 60 degrees) making up the horizontal scanning range of the field of view. In this case, transmission optics (not illustrated) is used to extend the field of view by increasing (e.g., doubling) the angular range of transmitted light from the MEMS mirror 12. Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two scans are used for each scanning period. Different regions (e.g., different vertical regions) of the field of view may be targeted during each scan or scanning period. Multiple scans may be used to generate distance and depth maps, as well as 3D images by a processing unit.

While the transmission mirror is described in the context of a MEMS mirror, it will be appreciated that other mirrors can also be used. In addition, the degree of rotation is not limited to +/−15 degrees, and the field of view may be increased or decreased according to the application. Thus, a scanning mirror is configured to oscillate about one or more scanning axes and direct the laser beams at different directions into a field of view.

Upon impinging one or more objects, the transmitted laser light is reflected by backscattering back towards the LIDAR scanning system 100 as a reflected light where the receiver 22 receives the reflected light. The receiver incudes a receiver mirror that receives the reflected light and directs the light along the receiver path. The receiver mirror may be the MEMS mirror 12 or a second MEMS mirror separate from MEMS mirror 12.

The receiver path includes a receiver optical component (e.g., a lens) that receives the reflected light from the receiver mirror. Thus, the receiver mirror may receive light from a specified receiving direction based on the transmission direction of the MEMS mirror 12, and direct the light towards the receiver optical component so that the angle of incidence on the receiver optical component is the same regardless of the receiving direction, which changes as the field of view is scanned.

The receiver optical component directs the reflected light onto a further receiver component, such as a spatial filter, to be described in more detail below. Ultimately, the received light is projected onto a photodetector array 15 that is configured to generate electrical measurement signals based on the received light incident thereon. The electrical measurement signals may be used by the system controller 23, received as raw sensor data, for generating a 3D map of the environment and/or other object data based on the reflected light (e.g., via TOF calculations and processing).

The MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes are activated to sense, and thus measure, a reflected light signal. Thus, a higher accuracy in position sensing of the MEMS mirror results in a more accurate and precise control of other components of the LIDAR system.

The receiver unit 22 includes the photodetector array 15 as well as a receiver circuit 24 that includes a readout circuit that includes one or more readout channels coupled to the photodetector array 15. As will be described in more detail below, a SiPM cell of the photodetector array 15 may be coupled to a readout channel of the receiver circuit 24, which receives the electrical signals therefrom.

The photodetector array 15 is a silicon photomultiplier (SiPM) array or a single-photon avalanche diode (SPAD) array used for detecting reflected laser light. It is noted that each SiPM may be referred to as a SiPM pixel or SiPM cell that comprises a plurality of microcells, each microcell comprising a single-photon avalanche diode (SPAD) in series with a quenching circuit, such as resistor or a transistor. Thus, each SiPM pixel comprises an array of SPADs. In other words, a single SiPM pixel may be referred to as a SPAD array and each SPAD may be referred to as a SPAD pixel.

Upon receiving a photon, a SPAD generates an electrical pulse. The intensity of the signal generated by a SiPM is obtained by counting (photon counting) the number of output pulses generated by its active SPADs within a measurement time slot, or by detecting cumulative current of all SPADs not resolving each photon event, while the time-dependent waveform of the signal is obtained by measuring the time distribution of the output signal.

In particular, a SPAD is a solid-state photodetector in which a photon-generated carrier (via the internal photoelectric effect) can trigger a short-duration but relatively large avalanche current. This avalanche is created through a mechanism called impact ionization, whereby carriers (electrons and/or holes) are accelerated to high kinetic energies through a large potential gradient (voltage). If the kinetic energy of a carrier is sufficient (as a function of the ionization energy of the bulk material) further carriers are liberated from the atomic lattice. The number of carriers thus increases exponentially from, in some cases, as few as a single carrier.

The avalanche current rises swiftly [sub-nanosecond risetime] to a macroscopic steady level in the milliampere range. If the primary carrier is photo-generated, the leading edge of the avalanche pulse marks [with picosecond time jitter] the arrival time of the detected photon. The current continues until the avalanche is quenched by lowering the bias voltage stored by the internal capacitance down to or below breakdown voltage.

When this occurs, the lower electric field is no longer able to accelerate carriers to impact-ionize with lattice atoms, therefore the current ceases. In order to be able to detect another photon, the internal capacitance of the SPAD the bias voltage at the internal capacitance must be raised again (i.e., recharged) above the breakdown voltage. This recharging time results in the SPAD being blind or deactivated until the internal capacitance is recharged above the breakdown voltage. The circuit responsible for quenching the avalanche current and the subsequent recharging of the internal capacitance is referred to as a quenching circuit.

This operation requires a suitable circuit, which has to: sense the leading edge of the avalanche current, generate a standard output pulse synchronous with the avalanche build-up, quench the avalanche by lowering the bias down to or below the breakdown voltage, and restore the photodiode to the operative level (i.e., to above the breakdown voltage).

Each SPAD may be selectively activated and deactivated. This can be done, for example, selectively coupling (activating) or decoupling (deactivating) a SPAD to an output of the SiPM or selectively activating or deactivating its respective quenching circuit so that the SPAD no longer recharges to an operational level. However, it will be appreciated that the activation and deactivation of a SPAD is not limited to these example techniques.

Additionally, array of SPADs may be a 1D array of SPADs or a 2D array of SPAD. For example, a SiPM pixel may include a 1D array of SPADs in which the SPADs are arranged in a single line (e.g., a single row of SPADs). This type of SiPM pixel may be referred to as a 1D SiPM pixel.

Multiple 1D SiPM pixel, each with its own output coupled to a readout channel, may be used to create a 2D array of SPADs.

Alternatively, a SiPM pixel may include a 2D array of SPADs in which the SPADs are arranged in two directions forming multiple rows and columns. This type of SiPM pixel may be referred to as a 2D SiPM pixel. Each 2D SiPM pixel has its own output coupled to a readout channel. Regardless of being a 1D or 2D array, each SiPM pixel generates an electrical signal that is output to a corresponding readout channel that provides the electrical signal to a signal processing chain (not illustrated).

As noted above, the receiver circuit 24 includes a readout circuit that further includes one or more readout channels coupled to the photodetector array 15. The receiver circuit 24 may receive the electrical signals from the one or more SiPM pixels of the photodetector array 15 and transmit the electrical signals as raw sensor data to the system controller 23 for ToF measurement and generation of object data (e.g., 3D point cloud data). The readout circuit 24 may also receive trigger control signals from the system controller 23 that instruct which SPADs to activate or deactivate. The readout circuit 24, in turn, may be configured to activate or deactivate particular SPADs of the photodetector array 15. The receiver circuit 24 may also receive gain setting control signals for controlling the gain of one or more photodetectors.

The system controller 23 may receive the sensor signals mapped to a SiPM (or SPAD) and receiving direction and having a certain intensity or amplitude, as well as timing information related to the time-of-flight from the receiver circuit 24. Differences in return times for each light pulse across different receiving directions can then be used by the system controller 23 to make digital 3D representations of an environment or to generate other sensor data. For example, the light source 10 may emit a single light pulse, and a receiver circuit electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance.

In one example, for each distance sampling, a microcontroller triggers a laser pulse from the illumination unit 10 and also starts a timer in a Time-to-Digital Converter (TDC) Integrated Circuit (IC). This can also be performed using a field-programmable gate array (FPGA). The laser pulse is propagated through the transmission optics, reflected by the target field, and captured by one or more receiving photodiodes of the photodetector array 15. Each receiving SiPM emits a short electrical pulse that is read out by the readout circuit.

A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. A raster scan could also be used.

Figure 2:
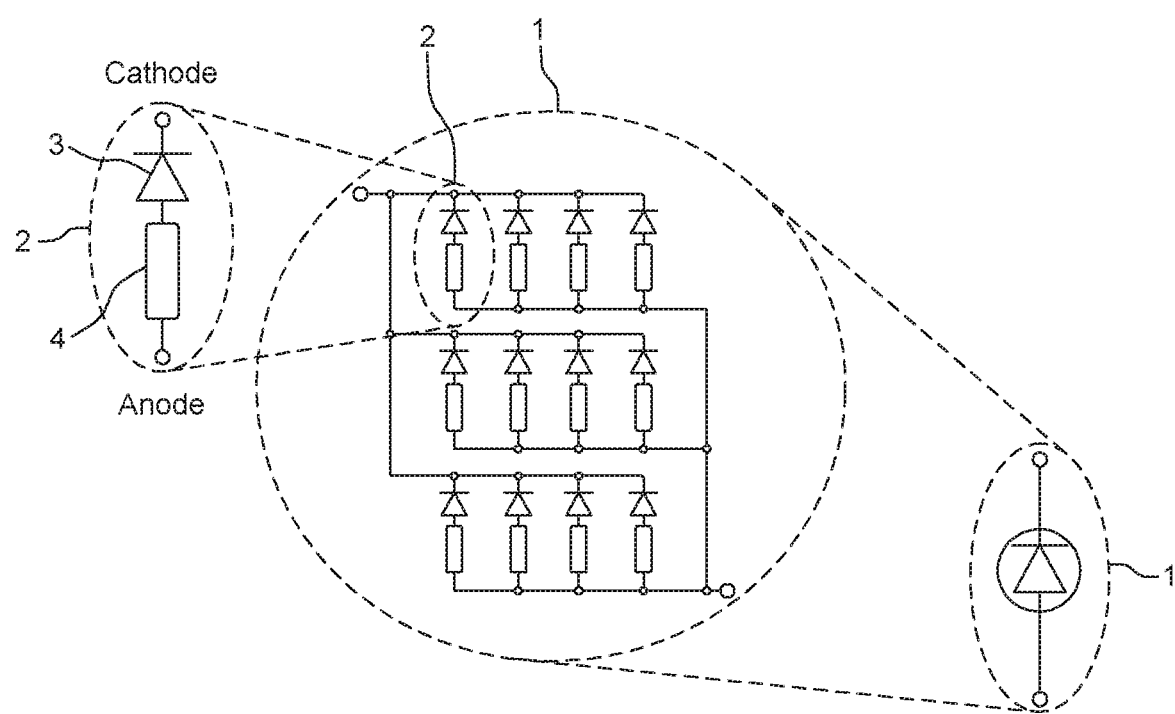
FIG. 2 is a schematic diagram of a SiPM pixel (i.e., a 2D SiPM pixel) according to one or more embodiments.

FIG. 2 is a schematic diagram of a SiPM pixel 1 (i.e., a 2D SiPM pixel) according to one or more embodiments. The SiPM pixel 1 includes an array of microcells 2, each of which includes a SPAD 3 and a quenching circuit 4. Each quenching circuit 4 may include a resistor and a switch, a transistor, or other type of quenching circuitry. In this example, twelve microcells 2 are included. Thus, this SiPM 1 has twelve SPADs arranged in an array. The output of the SiPM pixel 1 is cumulative according to the electrical signals generated by the SPADs 3. For example, if only one SPAD in the array detects a photon during a measurement period, the output of the SiPM pixel may have an intensity I. On the other hand, if five SPADs in the array each detect a photon during a measurement period, the output of the SiPM pixel 1 may have an intensity 5I. If all SPADs in the array each detect a photon during a measurement period, the output of the SiPM pixel 1 may have an intensity 12I. Thus, the contributions of all SPADs 3 in the SiPM pixel 1 are added to generate the output signal. The number of SiPM pixels and the number of SPAD pixels within each SiPM pixel is entirely configurable.

FIG. 3 is a schematic diagram of a LIDAR receiver 300 according to one or more embodiments. The LIDAR receiver 300 includes a 2D-scanning receiver mirror 31, a receiver lens 32, a spatial filter 33 arranged in a focal plane of the receiver lens 32, and a SiPM pixel 34. FIG. 3 depicts a side view of these elements as well as a front view of the SiPM pixel 34 on the far right to illustrate light being incident thereon.

The 2D-scanning receiver mirror 31 is configured to rotate about two axes that are orthogonal to each other. Thus, the 2D-scanning receiver mirror 31 has two degrees of freedom to rotate. The 2D-scanning receiver mirror 31 is configured to receive reflected light, including reflected laser beams transmitted by the LIDAR system (e.g., transmitted by MEMS mirror 12) and ambient light. In order to receive reflected laser beams, the position of the 2D-scanning receiver mirror 31 is aligned with a receiving direction that corresponds to the transmission direction of the transmitted laser beam. In some cases, the 2D-scanning receiver mirror 31 may be the MEMS mirror 12 itself, in which case the MEMS mirror 12 is configured to both transmit and receive light. In that case, a beam splitter (not illustrated) placed in the transmitter/receiver path would also be required.

The 2D-scanning receiver mirror 31 is configured to receive light and redirect the received light at the receiver lens 32, also referred to as a receiver optical component. The angle of incidence of light on the receiver lens 32 is always the same and remains constant due to the scanning technique implemented by the 2D-scanning receiver mirror 31.

The spatial filter 33 is interposed between the lens 32 and the SiPM pixel 34. The spatial filter 33 includes an aperture 35 located at the focal point of the lens 32. The aperture 35 is configured to spread the received light RL across the SiPM pixel 34. In this case, the SiPM pixel 34 is a 2D SiPM pixel that includes an array of SPAD pixels 36 (e.g., a 5×5 SPAD array). Each square in the SiPM pixel 34 represents a microcell, and thereby represents an individual SPAD pixel. The SiPM pixel 34 is coupled to a single readout channel CH that is configured to receive electrical signals generated by the SiPM pixel 34 and carry the electrical signals to the readout circuit.

The SiPM pixel 34 may be positioned relative to the aperture 35 such that the received light propagates through the aperture 35 and spreads across the height and width of the SiPM pixel 34. Thus, the aperture spreads the received light in two directions (i.e., in at least one direction) orthogonal to the receiver path. Preferably, the aperture 35 spreads the light across the full height and the full width of the SiPM pixel 34 in order to maximize the number of SPAD pixels 36 that receive the light.

The light includes both laser light (i.e., signal photons) and ambient light (i.e., ambient photons). By spreading the light across the SPAD array, the number of SPAD pixels that receive the light is increased. Furthermore, ambient photons and signal photons are spread apart from each other, thus reducing the ambient light flux per SPAD pixel. As a result, the probability of detecting signal photons by the SiPM pixel 34 is increased.

Thus, the aperture 35 not only limits the amount of light that reaches or is directed towards a SiPM pixel 34, since only light at the aperture 35 is passed therethrough, but it also spreads the light across a larger number of SPAD pixels 36 of a SiPM pixel 34. As a result, fixed amount of photon flux (e.g., 24 photons/ns) is distributed across a larger area of the SiPM pixel 34, meaning that the ambient light flux per single SPAD pixel 36 is reduced. As such, each SPAD pixel 36 may remain open for receiving a photon for a larger amount of time instead of always being saturated.

In addition, by this arrangement, the entire field of view may be scanned using a single aperture 35 and a single SiPM pixel 34. Thus, light transmitted in different directions by a transmitter is received by the lens 32 and directed towards the aperture 35 regardless of the transmission direction. As a result, the same SiPM 34 receives light transmitted in multiple directions across the field of view. In other words, aside from the mirror 31, the components of the LIDAR receiver 300 are static.

Electrical signals (i.e., pulses) generated by the SiPM pixel 34 are received by a signal processor at the system controller 23, which also tracks the transmission direction of a laser beam with those electrical signals generated by the SiPM pixel 34. In this way, the signal processor is configured to construct image data based on transmission direction, intensity (i.e., magnitude) of the respective electrical pulses, and the time-of-flight measured based on a time period that starts when a laser beam is transmitted and ends when respective electrical pulses are detected.

As noted above, in a 2D scanning receiver, a laser dot is produced by the LIDAR receiver as the received laser beam projected onto lens 32 based on moving the scanning mirror 31 on two orthogonal axes. The scanning dot is received at the aperture 35 and spread by the aperture 35 across a SiPM pixel 34 in both horizontal and vertical directions (i.e., across both SPAD pixel columns and rows). A similar arrangement may be used in a 1D scanning receiver.

FIG. 4 is a schematic diagram of a LIDAR receiver 400 according to one or more embodiments. The LIDAR receiver 400 includes a 1D-scanning receiver mirror 41, a receiver lens 42, a spatial filter 43 arranged in a focal plane of the receiver lens 42, and a SiPM pixel array 44. FIG. 4 depicts a side view of these elements as well as a front view of the SiPM pixel array 44 on the far right to illustrate light being incident thereon.

The 1D-scanning receiver mirror 41 is configured to rotate about a single axis. Thus, the 1D-scanning receiver mirror 41 has one degree of freedom to rotate. The 1D-scanning receiver mirror 41 is configured to receive reflected light, including reflected laser beams transmitted by the LIDAR system (e.g., transmitted by MEMS mirror 12) and ambient light. In order to receive reflected laser beams, the position of the 1D-scanning receiver mirror 41 is aligned with a receiving direction that corresponds to the transmission direction of the transmitted laser beam. In some cases, the 1D-scanning receiver mirror 41 may be the MEMS mirror 12 itself, in which case the MEMS mirror 12 is configured to both transmit and receive light. In that case, a beam splitter (not illustrated) placed in the transmitter/receiver path would also be required.

The 1D-scanning receiver mirror 41 is configured to receive light and redirect the received light at the receiver lens 42, also referred to as a receiver optical component. The angle of incidence of light on the receiver lens 42 is always the same and remains constant due to the scanning technique implemented by the 1D-scanning receiver mirror 41.

The spatial filter 43 is interposed between the lens 42 and the SiPM pixel array 44. The spatial filter 43 includes an aperture 45 located at the focal point of the lens 42. The aperture 45 is configured to spread the received light RL across the SiPM pixel array 44.

In this case, the SiPM pixel array 44 includes multiple SiPM pixels 47-1 to 47-5. Each SiPM pixel is a 1D SiPM pixel and, together, the SiPM pixels 47-1 to 47-5 form a 2D SPAD array. That is, each SiPM pixel has a 1D array of SPAD pixels 46 (e.g., a 1×5 SPAD array) that consists of one row and five columns. Each square in the SiPM pixels 47-1 to 47-5 represents a microcell, and thereby represents an individual SPAD pixel 46. Furthermore, each SiPM pixel 47-1 to 47-5 is coupled to its own respective readout channel Ch1-Ch5 that is configured to receive electrical signals generated its respective SiPM pixel and carry the electrical signals to the readout circuit.

The SiPM pixel array 44 may be positioned relative to the aperture 45 such that the received light propagates through the aperture 45 and spreads across the height or the width of the SiPM array 44. It is noted that in a 1D scanner, light is already spread in one direction at the scanning mirror 41. Thus, the received light is only spread in the other dimension by the aperture 45. As a result, the light incident on the SiPM array 44 may have a square shape. Preferably, the aperture 45 spreads the light across the full height or the full width of the SiPM pixel array 44 in order to maximize the number of SPAD pixels 46 that receive the light.

The light includes both laser light (i.e., signal photons) and ambient light (i.e., ambient photons). By spreading the light across each SPAD array, the number of SPAD pixels that receive the light is increased. Furthermore, ambient photons and signal photons are spread apart from each other, thus reducing the ambient light flux per SPAD pixel. As a result, the probability of detecting signal photons by the SiPM pixel array 44 is increased.

Thus, the aperture 45 not only limits the amount of light that reaches or is directed towards a SiPM pixel array 44, since only light at the aperture 45 is passed therethrough, but it also spreads the light across a larger number of SPAD pixels 46 of a SiPM pixel array 44. As a result, fixed amount of photon flux (e.g., 24 photons/ns) is distributed across a larger area of the SiPM pixel array 44, meaning that the ambient light flux per single SPAD pixel 46 is reduced. As such, each SPAD pixel 46 may remain open for receiving a photon for a larger amount of time instead of always being saturated.

In addition, by this arrangement, the entire field of view may be scanned using a single aperture 45 and the SiPM pixel array 44. Thus, light transmitted in different directions by a transmitter is received by the lens 42 and directed towards the aperture 45 regardless of the transmission direction. As a result, the SiPM pixel array 44 receives light transmitted in multiple directions across the field of view. In other words, aside from the mirror 41, the components of the LIDAR receiver 400 are static.

Electrical signals (i.e., pulses) generated by the SiPM pixel array 44 are received by a signal processor at the system controller 23, which also tracks the transmission direction of a laser beam with those electrical signals generated by the SiPM pixel array 44. In this way, the signal processor is configured to construct image data based on transmission direction, intensity (i.e., magnitude) of the respective electrical pulses, and the time-of-flight measured based on a time period that starts when a laser beam is transmitted and ends when respective electrical pulses are detected.

Figure 5:
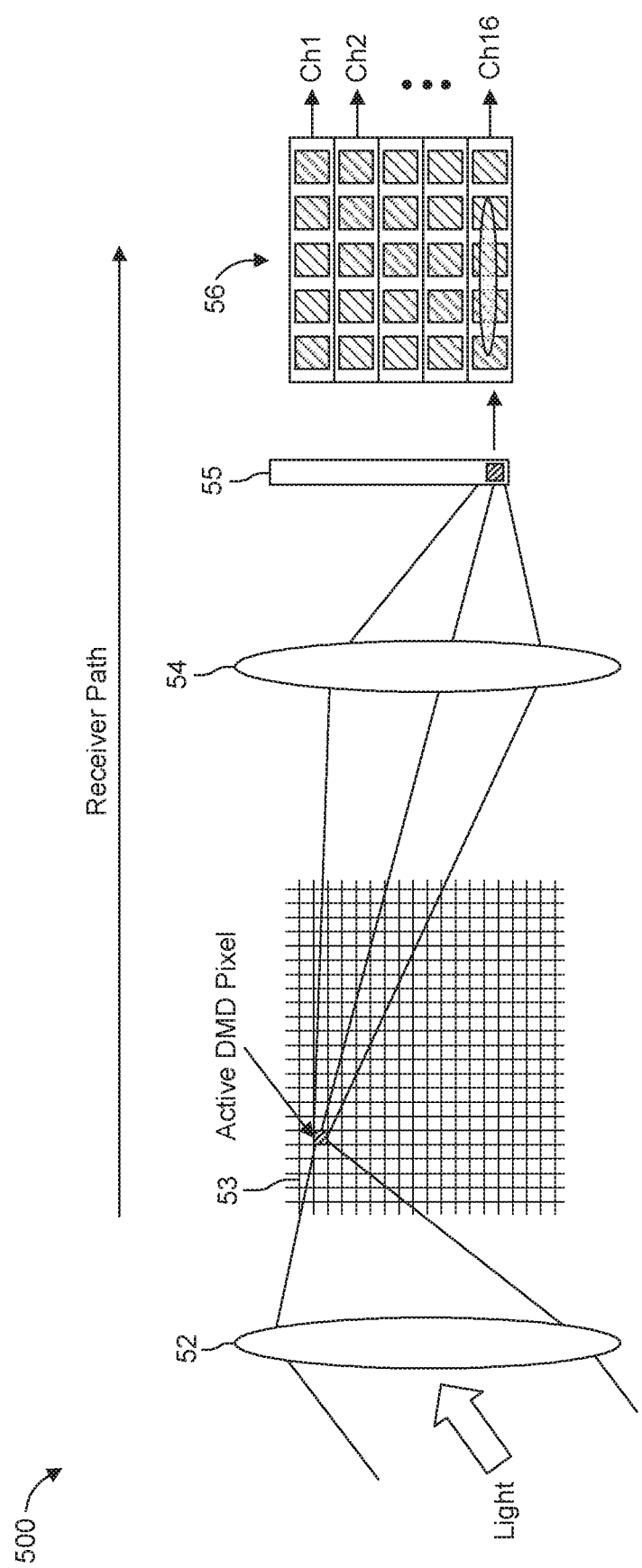
FIG. 5 is a schematic diagram of a LIDAR receiver 500 according to one or more embodiments.

FIG. 5 is a schematic diagram of a LIDAR receiver 500 according to one or more embodiments. The LIDAR receiver 500 includes a receiver optics 52 (i.e., a receiver lens) that receives light from a LIDAR field of view, a digital micromirror device (DMD) 53 arranged in the focal plane of the receiver optics 52, a projection optics 54 (i.e., a projection lens) that receives light from the DMD 53, a diffusor optics 55 (i.e., a scrambling optics) that receives light from the projection optics 54, and a SiPM pixel array 56 comprised of a sixteen 1D SiPM pixels that receives light from the diffusor optics 55. Each SiPM pixel incudes a 1D array of SPADs arranged in a row and generates its own electrical signal that is output to a corresponding readout channel Ch1-Ch16.

The DMD 53 acts as a spatial filter which further deflects the received light towards the projection optics 54. The DMD 53 is a two dimensional array of modulator elements, each of which may be referred to as a DMD pixel. Each modulator element may be a micro-mirror that is configured to be activated (i.e., turned ON) or deactivated (i.e., turned OFF) by receiving electrical signals sent from a controller (e.g., a microcontroller or other processing unit). The electrical signals control a tilting mechanism of a corresponding modulator element. Thus, the modulator element each have a corresponding data storage unit that are each individually addressable during an active illumination period, and each modulator element can be switched between at least two states many thousands of times per second. In the following examples, the modulator elements are referred to as micromirrors, but are not limited thereto, and could be other type of reflective element or pixel element that modulate light towards or away from the projection optics.

In the activated state, a tilt of a micro-mirror is configured to reflect received light towards the projection optics. The projection optics is configured to project the light onto a corresponding region of the diffusor optics based on an angle at which the light is received at the projection optics (i.e., corresponding to an activated micro-mirror). The diffusor optics, in turn, directs light towards a specific SiPM pixel of the SiPM pixel array 56 that corresponds to the activated micro-mirror. As a result, the initially received light is spread at least partially across one of the SiPM pixels based on an activated DMD pixel. Different DMD pixels are configured to project light onto one of the SiPM pixels. Thus, each DMD pixel is mapped to one of the SiPM pixels.

One or more DMD pixels or an entire DMD pixel column may be activated based a transmission direction of the transmitted laser beam in anticipation of receiving reflected light from a receiving direction that correspond to the transmission direction. When an entire DMD pixel column is activated, each of the SiPM pixels receives light.

DMD pixels or micromirrors that do not correspond to the transmission direction may be deactivated by the system controller 23. In a deactivated state, a tilt of the micro-mirror is configured such that light impinging on the micro-mirror is deflected away from the projection optics. As such, ambient light outside of the receiving direction can be deflected away from the projection optics, and thus away from the SiPM pixel array 56.

The DMD 53 is one type of reflective spatial light modulator (SLM) that may be used in accordance with the embodiments provided herein. In general, a SLM includes an array of pixel elements that are configured to direct (e.g., reflect) light towards the projection optics when activated and away from the projection optics when deactivated. Thus, other types of SLMs may be used instead of a DMD.

The diffusor optics 55 is a scrambling optics configured to spread the light across an entire SiPM pixel (e.g., across an entire row of SPAD pixels) to reduce ambient light flux per single SPAD. The diffusor optics can be implemented using cylinder lens, a homogenizer, or a dispersion element.

A sufficient number of SPAD cells in each SiPM pixel should be provided to handle the ambient light. Furthermore, implementing more SPAD pixels will help to increase the dynamic range.

Figure 6:
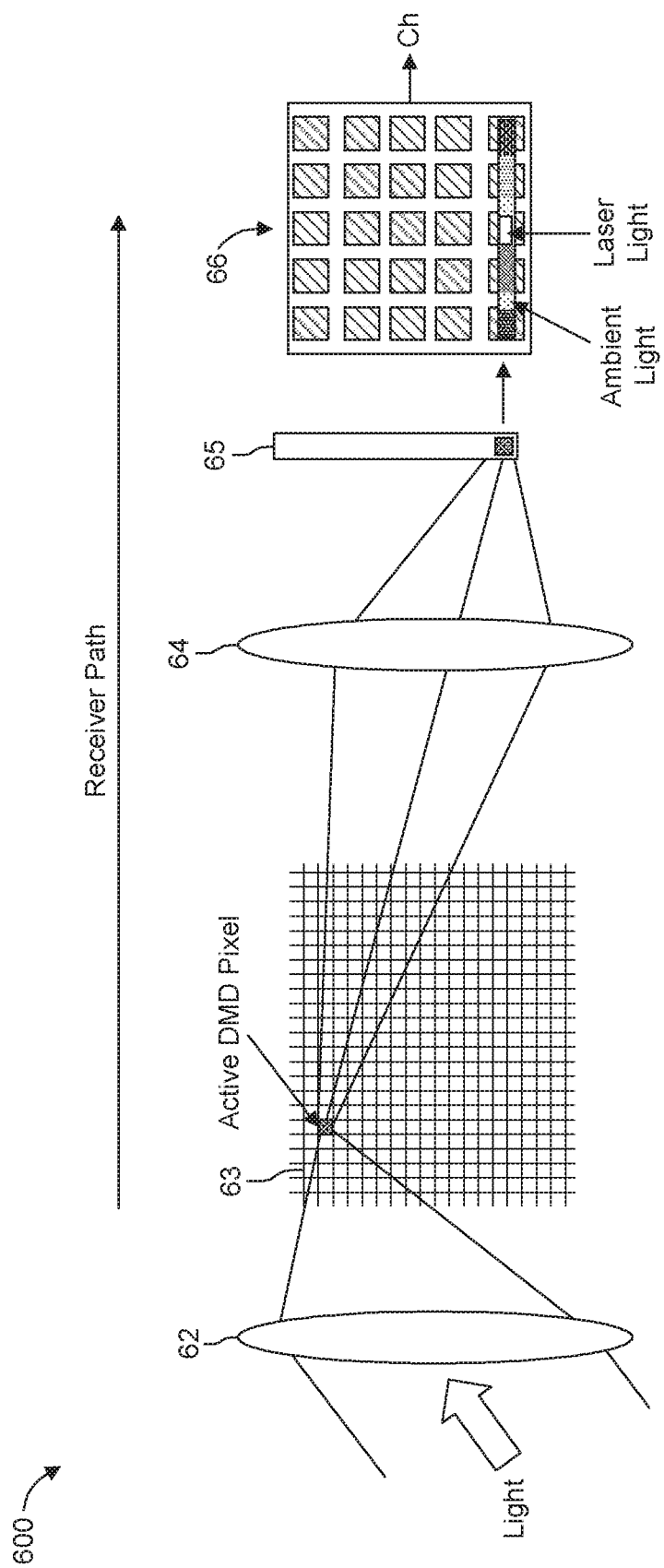
FIG. 6 is a schematic diagram of a LIDAR receiver 600 according to one or more embodiments.

FIG. 6 is a schematic diagram of a LIDAR receiver 600 according to one or more embodiments. The LIDAR receiver 600 includes a receiver optics 62 (i.e., a receiver lens) that receives light from a LIDAR field of view, a digital micromirror device (DMD) 63 arranged in the focal plane of the receiver optics 62, a projection optics 64 (i.e., a projection lens) that receives light from the DMD 63, a dispersion optics 65 (i.e., a prism or diffraction grating) that receives light from the projection optics 64, and a 2D SiPM pixel 66 comprised of a 2D array of SPAD pixels that receives light from the dispersion optics 65. The SiPM pixel 66 incudes a 2D array of SPADs arranged in multiple rows and columns and generates its own electrical signal that is output to a corresponding readout channel Ch.

The LIDAR receiver 600 is similar to the LIDAR receiver 500 shown in FIG. 5 with the exception that the dispersion optics 65 replaces the diffusor optics 55. It is also possible to exchange the 2D SiPM pixel 66 with SiPM pixel array 56, which includes a plurality of 1D SiPM pixels.

The dispersion optics 65 is configured to disperse the spectrum of the received light across a row of SPAD pixels of the SiPM pixel 66. Each SPAD pixel receives a different portion of the spread spectrum of the received light. The spectrum of the ambient light is different from the spectrum of the laser light. For example, the spectrum of the ambient light may be the sun spectrum, whereas the laser light may be a monochromatic or substantially monochromatic spectrum. Thus, the spectrum of laser light is much narrower than the spectrum of ambient light. As such, the spectrum of the ambient light may be spread across several or many SPAD pixels. However, the spectrum of laser light may be incident on a single SPAD pixel or fewer SPAD pixels.

It is noted that laser light may change its spectrum based on external factors, such as laser temperature or manufacturing variation. Thus, the location of the SPAD or SPADs that receive the laser light spectrum in the row of SPADs may change or shift based on a laser temperature change, which causes the wavelength of the laser to shift. This shift in position in the SPAD array may be monitored by the system controller that is configured to measure the laser temperature via sensor 26 and determine the position of the "signal" SPAD pixel or pixels based on the measured laser temperature. A SPAD pixel or pixels corresponding to the determined location may be activated by the system controller 23 while the remaining SPAD pixels may be ignored or deactivated by the system controller 23 as corresponding to ambient light.

As noted above, when an entire DMD pixel column is activated, each row of the SPAD array receives light. As a result, one or a select few SPAD pixel columns may correspond to the determined location of the laser light spectrum. Thus, this corresponding SPAD column or columns may be activated and read out, while the remaining SPAD columns may be deactivated or ignored.

Alternatively, all SPAD pixels may remain activated, read out, and the sensor information thereof stored in memory. Here, sensor information generated by those SPAD pixels not in the determined location may be separated from sensor information generated by "signal" SPADs and used for other purposes. For example, the spectrum of ambient light can be recorded and used for generating a color image of environment, which may help with sensor fusion and object classification.

Additionally or alternatively, the spectrum of ambient light can be recorded and used for generating a hyperspectral image of environment, which may also help with object classification. Since different spectral components are received in different SPAD columns, these detected spectral components from ambient light (i.e., non-laser light spectral components) may indicate the color of an object that reflects the ambient light. A signal processor at the system controller 23 may receive this color information from the remaining SPAD pixels that do not correspond to the determined location of the laser light spectrum and use the color information to classify a type of object that reflected the ambient light.

In view of the LIDAR receivers shown in FIGS. 3-6, a LIDAR receiver use one or more SiPM pixels and reduces the number of ambient photons capable of reaching a SPAD pixel while increasing the chances of signal (laser) photons to reach a SPAD. This increases the chances of detecting a useful signal photon that corresponds to a transmitted laser beam.

Alternatively, optical filtering is implemented in the electrical domain for processing sensor data. In this case, some or all SPADs may be activated and read out. Subsequently, digital filtering may be applied to the data of each SPAD pixel.

Figure 7:
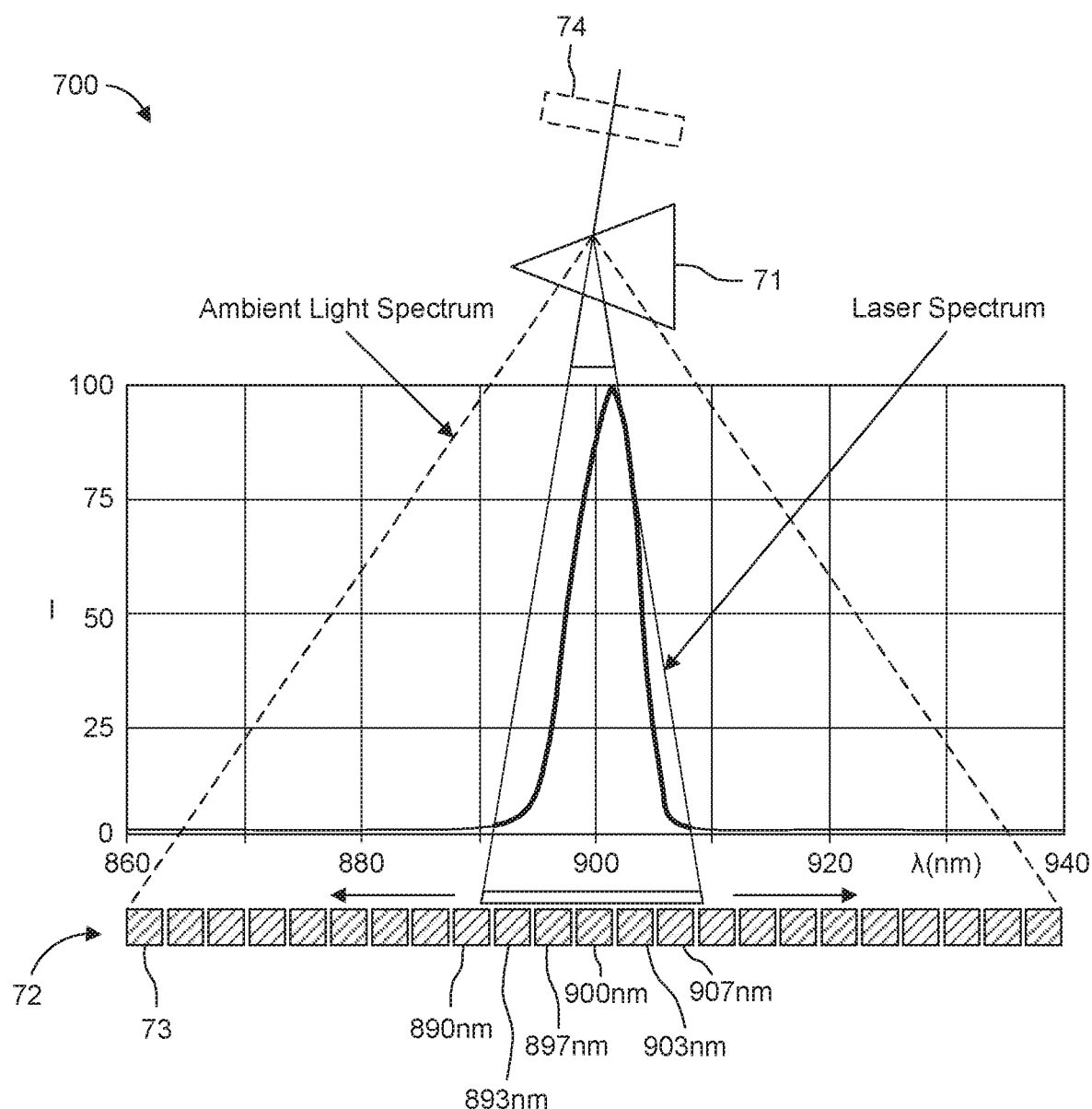
FIG. 7 is a schematic diagram of a LIDAR receiver 700 according to one or more embodiments.

FIG. 7 is a schematic diagram of a LIDAR receiver 700 according to one or more embodiments. The LIDAR receiver 700 includes a dispersion optics 71 (i.e., a prism or diffraction grating) that receives incoming light and projects dispersed light onto one or more SiPM pixels of a detector array 72. Here, a row of SPAD pixels 73 is shown upon which ambient light and laser light is incident. The detector array 72 may be made up of a single 2D SiPM pixel, multiple 2D SiPM pixels, or multiple 1D SiPM pixels.

A typical spectrum of a 905 nm laser diode is shown that has its center (peak) at 905 nm and its edges spread from about 890 nm to 910 nm due to its Gaussian distribution. Thus, a typical spectrum of a 905 nm laser diode has a spread of about 20 nm, from about 890 nm to 910 nm at normal operating temperature. Additionally, the ambient light spectrum is superimposed on the laser spectrum but also spreads much wider due to the dispersion optics 71 and its larger spectral range.

Each SPAD pixel 73 may be mapped by the system controller 23 to correspond to a specific sub-range of the spectrum (i.e., to a specific wavelength range) or may be mapped to a specific center wavelength. For example, certain SPAD pixels 73 are shown corresponding to wavelengths 890 nm, 893 nm, 897 nm, 900 nm, 903 nm, and 907 nm, respectively. For this example, these SPAD pixels correspond to the laser spectrum, while the remaining SPAD pixels correspond only to the ambient light spectrum.

Similar to the concept described in conjunction with FIG. 6, the laser spectrum may shift based on the laser temperature, which can be measured by sensor 26. As a result, the location of the SPAD pixels at which the laser spectrum is incident may shift to the left or to the right depending on the laser temperature. The system controller 23 may determine which SPAD pixels 73 are relevant to the laser spectrum based on the laser temperature and which SPAD pixels are relevant only to the ambient light spectrum. For example, the system controller 23 may store a mapping of SPAD pixels 73 and laser temperatures, and determine which SPAD pixels 73 correspond and do not correspond to the laser spectrum based on the laser temperature. Thus, the location at which the laser spectrum will be projected onto the detector array 72 can be estimated by the system controller 23 and optical filtering can be electrically applied based on the determined location. For example, those SPAD pixels 73 corresponding to the laser spectrum may be activated or more heavily weighted and those SPAD pixels 73 that do not correspond to the laser spectrum may be deactivated or less heavily weighted.

An optional narrow bandpass filter 74 may be provided in front of the dispersion optics 71 to filter out ambient light that is outside the laser spectrum. This would help reduce noise caused by ambient light. However, the narrow bandpass filter 74 should be matched as close a possible to the spectrum of the laser, which should further take into account the bandwidth of the laser, production tolerances of the laser diode and the narrow bandpass filter 74, and possible wavelength shifts of the laser due to laser temperature. Thus, the passband of the narrow bandpass filter 74 cannot be made too narrow and ultimately some ambient light outside the laser spectrum will likely need to be tolerated.

Figure 8:
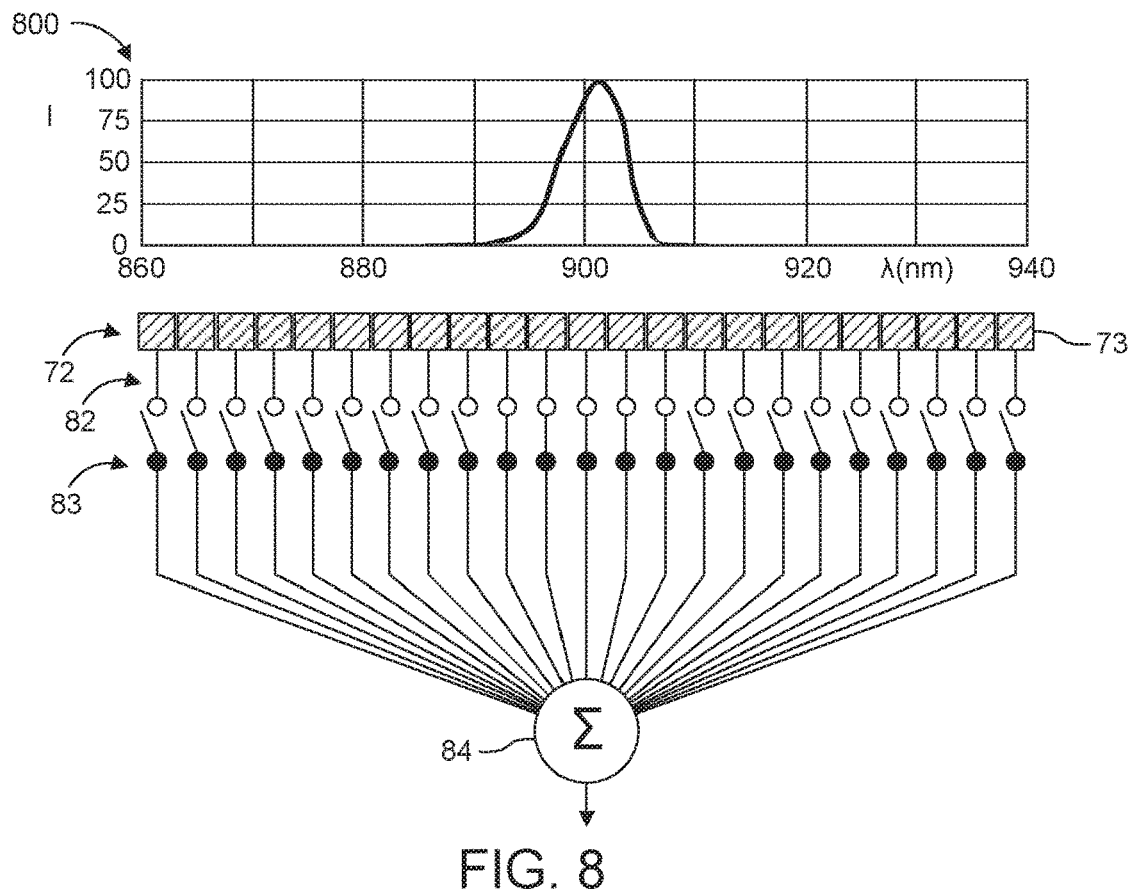
FIG. 8 is a schematic diagram of a LIDAR receiver 800 according to one or more embodiments.

FIG. 8 is a schematic diagram of a LIDAR receiver 800 according to one or more embodiments. In particular, the LIDAR receiver 800 expands upon the LIDAR receiver 700 and includes the dispersion optics 71 (not illustrated) and the detector array 72. In addition, the LIDAR receiver 800 includes a readout circuit that includes a readout channels 82, each coupled to a corresponding SPAD pixel 73, switches 83, each coupled to a corresponding readout channel 82, and a summer 84.

The switches 83 are controlled by the system controller 23 and are enabled (closed) or disabled (open) based on the determined location of the laser spectrum. Thus, those switches 83 that correspond to a SPAD pixel 73 located in the determined laser spectrum are enabled, while those switches 83 that do not correspond to a SPAD pixel 73 located in the determined laser spectrum are disabled.

As a result, the summer 84 only receives electrical signals from those SPAD pixels 73 that receive laser light, and the remaining electrical signals are filtered out. The summer 84 is configured to receive electrical signals from active SPAD pixels 73, sum those signals together, and provide a summed signal to the system controller 23.

Figure 9:
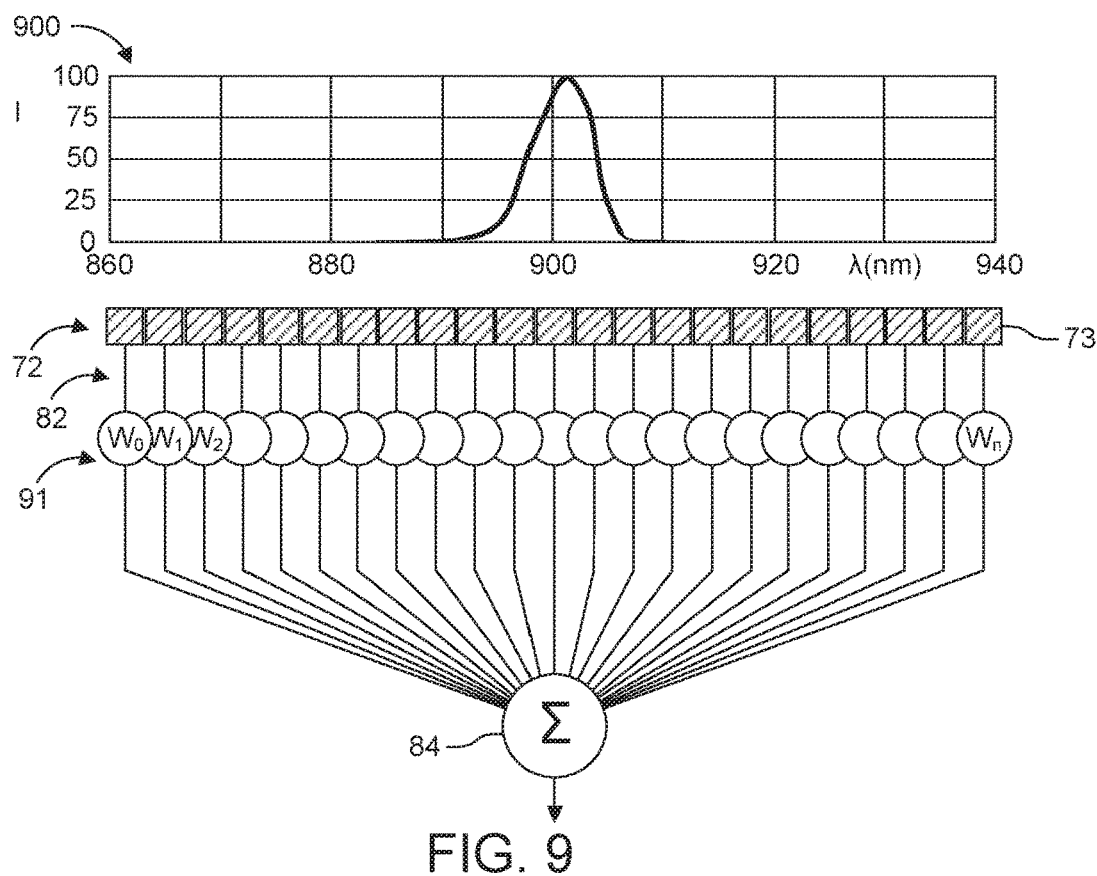
FIG. 9 is a schematic diagram of a LIDAR receiver 900 according to one or more embodiments.

FIG. 9 is a schematic diagram of a LIDAR receiver 900 according to one or more embodiments. In particular, the LIDAR receiver 900 expands upon the LIDAR receiver 700 and includes the dispersion optics 71 (not illustrated) and the detector array 72. In addition, the LIDAR receiver 900 includes a readout circuit that includes a readout channels 82, each coupled to a corresponding SPAD pixel 73, configurable weight logic units 91, each coupled to a corresponding readout channel 82, and a summer 84.

Each configurable weight logic unit 91 is assigned a weight (e.g., $W_0, W_1, W_2, \ldots W_n$) based on the on the determined location of the laser spectrum and may be reassigned a different weight if the determined location shifts (e.g., based on laser temperature). Thus, the SPAD pixel 73 located at the center of the laser spectrum may be assigned a highest weight and its configurable weight logic unit 91 may be set accordingly. Those SPAD pixels located adjacent to the center of the laser spectrum may be assigned a second highest weight and their configurable weight logic units 91 may be set accordingly. The assigned weights may decrease with further distance from the center wavelength, and may further match the intensity I of the laser spectrum.

Alternatively, those SPAD pixels corresponding to the laser spectrum may be assigned a first weight greater than zero, and those SPAD pixels corresponding to the laser spectrum may be assigned a weight of zero. Alternatively, those SPAD pixels (i.e. a first set) corresponding to the laser spectrum may be assigned a first weight greater than zero, one or more SPAD pixels (i.e., a second set) located adjacent to the laser spectrum may be assigned a second weight that is less than the first weight, and a third set of SPAD pixels outside of the first and the second sets may be assigned a weight of zero.

Thus, the configurable weight logic units 91 may be used to implement fixed or even sliding matched filter to further improve the signal-to-noise ratio (SNR).

The summer 84 is configured to receive electrical signals from all SPAD pixels 73, which have already been filtered based on assigned weights, and provide a summed signal to the system controller 23.

Figure 10:
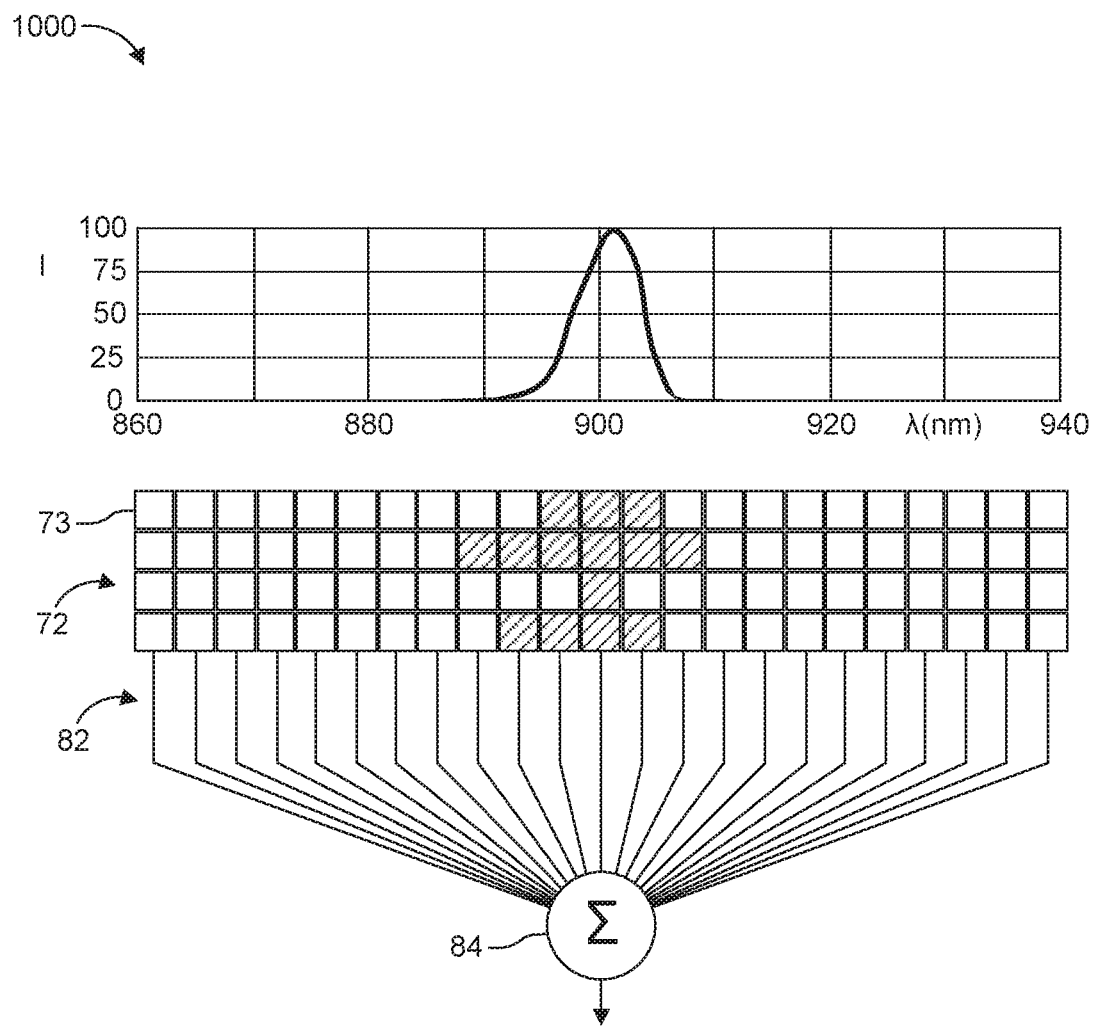
FIG. 10 is a schematic diagram of a LIDAR receiver 1000 according to one or more embodiments.

FIG. 10 is a schematic diagram of a LIDAR receiver 1000 according to one or more embodiments. In particular, the LIDAR receiver 1000 expands upon the LIDAR receiver 700 and includes the dispersion optics 71 (not illustrated) and the detector array 72. Here, the detector array 72 is a single SiPM pixel that has four rows of SPADs 73. In addition, the LIDAR receiver 1000 includes a readout circuit that includes a readout channels 82, each coupled to a corresponding column of SPAD pixels 73 and a summer 84.

The darkened SPAD pixels represent active SPAD pixels, whereas the remaining SPAD pixels represent deactivated SPAD pixels. As noted above, a SPAD pixel may be deactivated by preventing a recharge of its internal capacitance to the operative level (i.e., to above the breakdown voltage).

A SPAD column corresponding to the center wavelength of the laser spectrum may be fully activated (i.e., aligned with the full intensity I of the received laser beam). The SPAD columns directly adjacent to the center wavelength may be partially activated. In this case, three of the four SPAD pixels are activated in the adjacent columns which effectively have ¾ of the sensitivity of the fully activated SPAD column. The number of activated SPAD pixels in a column may be representative of the intensity I of the laser beam at that location, which is ¾ of the full intensity in this case. The sensitivity of the SPAD columns further from the center wavelength may be further decreased by activating a lesser portion of the SPAD pixels. Thus, this effectively implement weights by spreading the laser spectrum over several rows and only partially activating SPADs in a SPAD column. The weights may be matched to the expected intensity of the laser beam at a SPAD column, and the system controller 23 may shift the weights based on the determined location of the laser spectrum.

The summer 84 is configured to receive electrical signals from all active SPAD pixels 73, which have already been filtered based on assigned weights, and provide a summed signal to the system controller 23.

Although embodiments described herein relate to LIDAR receiver, it is to be understood that the concepts described herein may be extended to other types of receivers and imaging devices. For example, a camera using one or more SiPM cells to detect light may also use such a configuration for its receiver.

In addition, some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A Light Detection and Ranging (LIDAR) receiver, comprising:
   receiver optics having a focal plane and configured to receive at least one laser beam and direct the at least one laser beam along a receiver path;
   at least one silicon photomultiplier (SiPM) pixel comprising an array of single-photon avalanche diode (SPAD) pixels, the at least one SiPM pixel configured to generate at least one electrical signal based on the at least one laser beam;
   a spatial filter arranged in the focal plane of the receiver optics located between the receiver optics and the at least one SiPM pixel, the spatial filter comprising only a single aperture, wherein the single aperture is located at a focal point of the receiver optics that is configured to permit a passage of the at least one laser beam therethrough and spread the at least one laser beam in at least one direction orthogonal to the receiver path such that the at least one laser beam is spread across the array of SPAD pixels in the at least one direction;
a scanning mirror configured to rotate about at least one axis during a scanning operation,
wherein the receiver optics, the at least one SiPM, and the spatial filter are static,
wherein the scanning mirror is configured to receive the at least one laser beam and direct the at least one laser beam at the receiver optics such that an angle of incidence on the receiver optics remains constant for all receiving directions of all laser beams received during the scanning operation,
wherein all of the laser beams received during the scanning operation are transmitted through the single aperture for all of the receiving directions of the laser beams,
wherein the angle of incidence projected by the scanning mirror onto the receiver optics remains constant during the scanning operation for all tilt positions of the scanning mirror about the at least one axis,
wherein all of the laser beams received during the scanning operation are transmitted through the single aperture for all of the tilt positions of the scanning mirror about the at least one axis,
wherein the spatial filter is configured to limit an amount of photon flux, including a mixture of ambient light flux and laser light flux of the at least one laser beam, that passes from the receiver optics to the at least one SiPM to a predetermined limit, and
wherein the at least one SiPM is configured to receive a mixture of ambient light and laser light photons that are distributed across the array of SPAD pixels by the single aperture and limited by the amount of photon flux.

2. The LIDAR receiver of claim 1, wherein:
the scanning mirror is a one-dimensional scanning mirror configured to rotate about a single axis.

3. The LIDAR receiver of claim 2, wherein the at least one SiPM pixel comprises a plurality of SiPM pixels, each having a one-dimensional array of SPAD pixels that together form the array of SPAD pixels.

4. The LIDAR receiver of claim 1, wherein:
the scanning mirror is a two-dimensional scanning mirror configured to rotate about two axes.

5. The LIDAR receiver of claim 4, wherein the at least one SiPM pixel consists of a SiPM pixel comprising a two-dimensional array of SPADs that form the array of SPAD pixels.

6. A Light Detection and Ranging (LIDAR) receiver, comprising:
receiver optics having a focal plane and configured to receive at least one laser beam and direct the at least one laser beam along a receiver path;
at least one silicon photomultiplier (SiPM) pixel comprising an array of single-photon avalanche diode (SPAD) pixels, the at least one SiPM pixel configured to generate at least one electrical signal based on the at least one laser beam;
a spatial light modulator arranged in the focal plane of the receiver optics located between the receiver optics and the at least one SiPM pixel, wherein the spatial light modulator comprises an array of modulator elements that comprises a plurality of columns and a plurality of rows, each of the modulator elements is configured to switchably direct light towards or away from the at least one SiPM pixel;
a controller configured to sequentially activate sections of the spatial light modulator such that activated modulator elements of an activated section direct the at least one laser beam towards the at least one SiPM pixel;
a diffuser optics interposed between the spatial light modulator and the at least one SiPM pixel, wherein the diffuser optics is configured to receive the at least one laser beam directed by the spatial light modulator and spread the at least one laser beam across at least one row of the array of SPAD pixels; and
a projection optics interposed between the spatial light modulator and the diffusor optics, wherein the projection optics is configured to receive the at least one laser beam from the spatial light modulator and project the at least one laser beam onto a region of the diffuser optics corresponding to the activated section of the spatial light modulator, wherein different regions of the diffuser optics correspond to different activated sections of the spatial light modulator,
wherein the diffuser optics is configured to spread the at least one laser beam across a SiPM pixel that corresponds to the region of the diffuser optics that receives the at least one laser beam from the spatial light modulator.

7. The LIDAR receiver of claim 6, wherein the controller is configured to deactivate other sections of the spatial light modulator such that deactivated modulator elements of a deactivated section direct ambient light away from the at least one SiPM pixel.

8. The LIDAR receiver of claim 6, wherein the at least one SiPM pixel comprises a plurality of SiPM pixels, each having a one-dimensional array of SPAD pixels that together form the array of SPAD pixels.

9. The LIDAR receiver of claim 6, wherein the at least one SiPM pixel consists of a SiPM pixel comprising a two-dimensional array of SPADs that form the array of SPAD pixels.

10. The LIDAR receiver of claim 6, wherein the at least one SiPM pixel comprises a plurality of one-dimensional SiPM pixels, each having a respective one-dimensional array of SPAD pixels, wherein the plurality of one-dimensional SiPM pixels form the array of SPAD pixels, and wherein each of the plurality of one-dimensional SiPM pixels forms a different row of the array of SPAD pixels.

11. The LIDAR receiver of claim 6, wherein the spatial light modulator is a digital micromirror device (DMD).

12. A Light Detection and Ranging (LIDAR) receiver, comprising:
receiver optics having a focal plane and configured to receive at least one laser beam and direct the at least one laser beam along a receiver path;
at least one silicon photomultiplier (SiPM) pixel comprising an array of single-photon avalanche diode (SPAD) pixels, the at least one SiPM pixel configured to generate at least one electrical signal based on the at least one laser beam;
a spatial light modulator arranged in the focal plane of the receiver optics located between the receiver optics and the at least one SiPM pixel, wherein the spatial light modulator comprises an array of modulator elements that comprises a plurality of columns and a plurality of rows, each of the modulator elements is configured to switchably direct light towards or away from the at least one SiPM pixel;

a controller configured to sequentially activate sections of the spatial light modulator such that activated modulator elements of an activated section direct the at least one laser beam towards the at least one SiPM pixel; and a dispersion optics interposed between the spatial light modulator and the at least one SiPM pixel, wherein the dispersion optics is configured to receive light, including the at least one laser beam, directed by the spatial light modulator and disperse a spectrum of the light across at least one row of the array of SPAD pixels, wherein the spectrum of the light includes a laser spectrum corresponding to the at least one laser beam and an ambient light spectrum corresponding to ambient light received with the at least one laser beam, wherein the dispersion optics is configured to simultaneously spread the laser spectrum and the ambient light spectrum onto the at least one row of the array of SPAD pixels, wherein the laser spectrum is spread across a sub-portion of the at least one row of the array of SPAD pixels and the ambient light spectrum is spread across an entire portion of the at least one row of the array of SPAD pixels, wherein the ambient light spectrum overlaps with the laser spectrum on the at least one row of the array of SPAD pixels, wherein the controller is configured to isolate at least one first SPAD pixel that is located in the sub-portion from at least one second SPAD pixel located outside of the sub-portion, wherein the controller is configured to determine a location of the sub-portion based on a temperature of a laser device that that transmits the at least one laser beam, and wherein, based on the determined location of the sub-portion, the controller is configured to activate the at least one first SPAD pixel that is located in the sub-portion and deactivate the at least one second SPAD pixel located outside of the sub-portion, or, based on the determined location of the sub-portion, the controller is configured to isolate electrical signals generated by the at least one first SPAD pixel located in the sub-portion from electrical signals generated by the at least one second SPAD pixel located outside of the sub-portion.

13. The LIDAR receiver of claim 12, wherein the controller is configured to determine the at least one first SPAD pixel that is located in the sub-portion based on the temperature of a laser device.

14. The LIDAR receiver of claim 13, further comprising:
a temperature sensor configured to measure the temperature of the laser device that transmits the at least one laser beam and provide the temperature to the controller.

15. The LIDAR receiver of claim 12, further comprising:
a signal processor configured to generate a color image based on the electrical signals generated by the at least one first SPAD pixel located in the sub-portion and based on the electrical signals generated by the at least one second SPAD pixel located outside of the sub-portion.

16. The LIDAR receiver of claim 12, further comprising:
a signal processor configured to generate a hyperspectral image based on the electrical signals generated by the at least one first SPAD pixel located in the sub-portion and based on the electrical signals generated by the at least one second SPAD pixel located outside of the sub-portion.

17. The LIDAR receiver of claim 12, wherein the at least one SiPM pixel consists of a SiPM pixel comprising a two-dimensional array of SPADs that form the array of SPAD pixels.

18. The LIDAR receiver of claim 12, wherein the dispersion optics is a prism or a diffraction grating.

19. The LIDAR receiver of claim 1, wherein:
the spatial filter is configured distribute a fixed amount of photon flux, including the mixture of ambient light and laser light photons of the at least one laser beam, from the receiver optics to the at least one SiPM via the single aperture, and
the at least one SiPM is configured to receive the mixture of ambient light and laser light photons that are distributed across the array of SPAD pixels by the single aperture.

20. The LIDAR receiver of claim 12, wherein the dispersion optics is configured to disperse the spectrum of the light across the at least one row of the array of SPAD pixels such that different wavelength regions of the light are directed respectively to different columns of the array of SPAD pixels.

* * * * *